H. K. CLOVER.
ELECTRIC FAUCET.
APPLICATION FILED JAN. 14, 1919.
1,345,748.
Patented July 6, 1920.
4 SHEETS—SHEET 1.
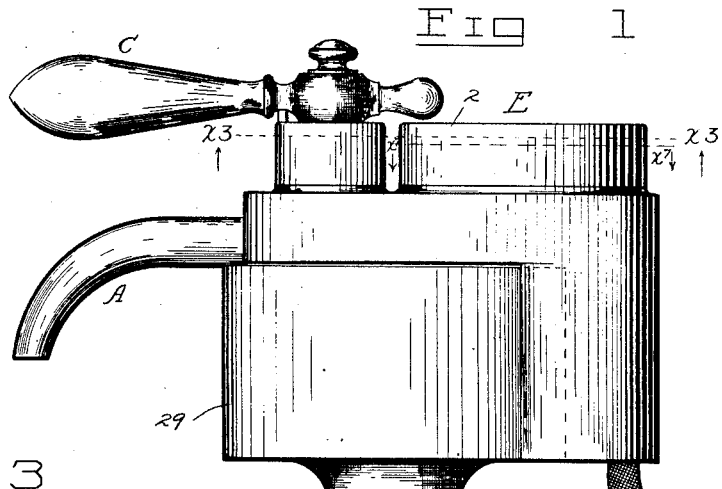
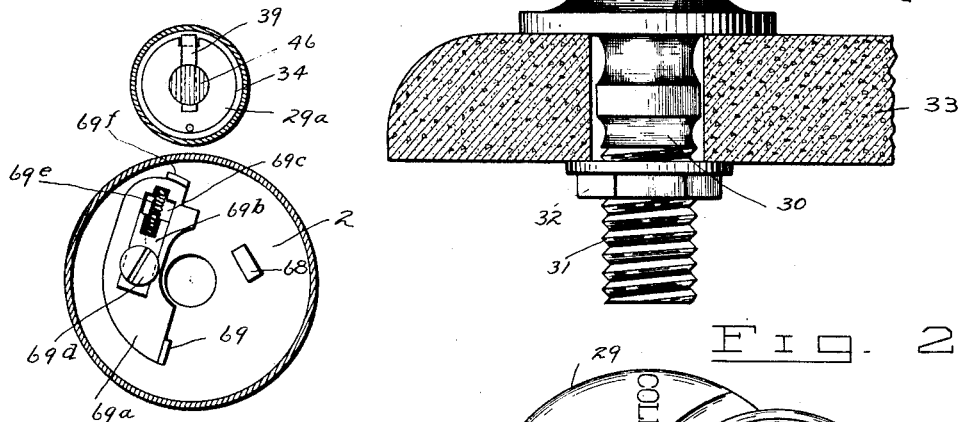
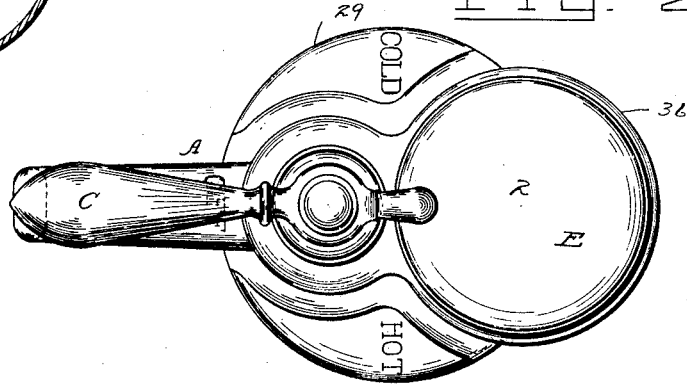
Inventor,
Howard K. Clover.
By
His Attorney.

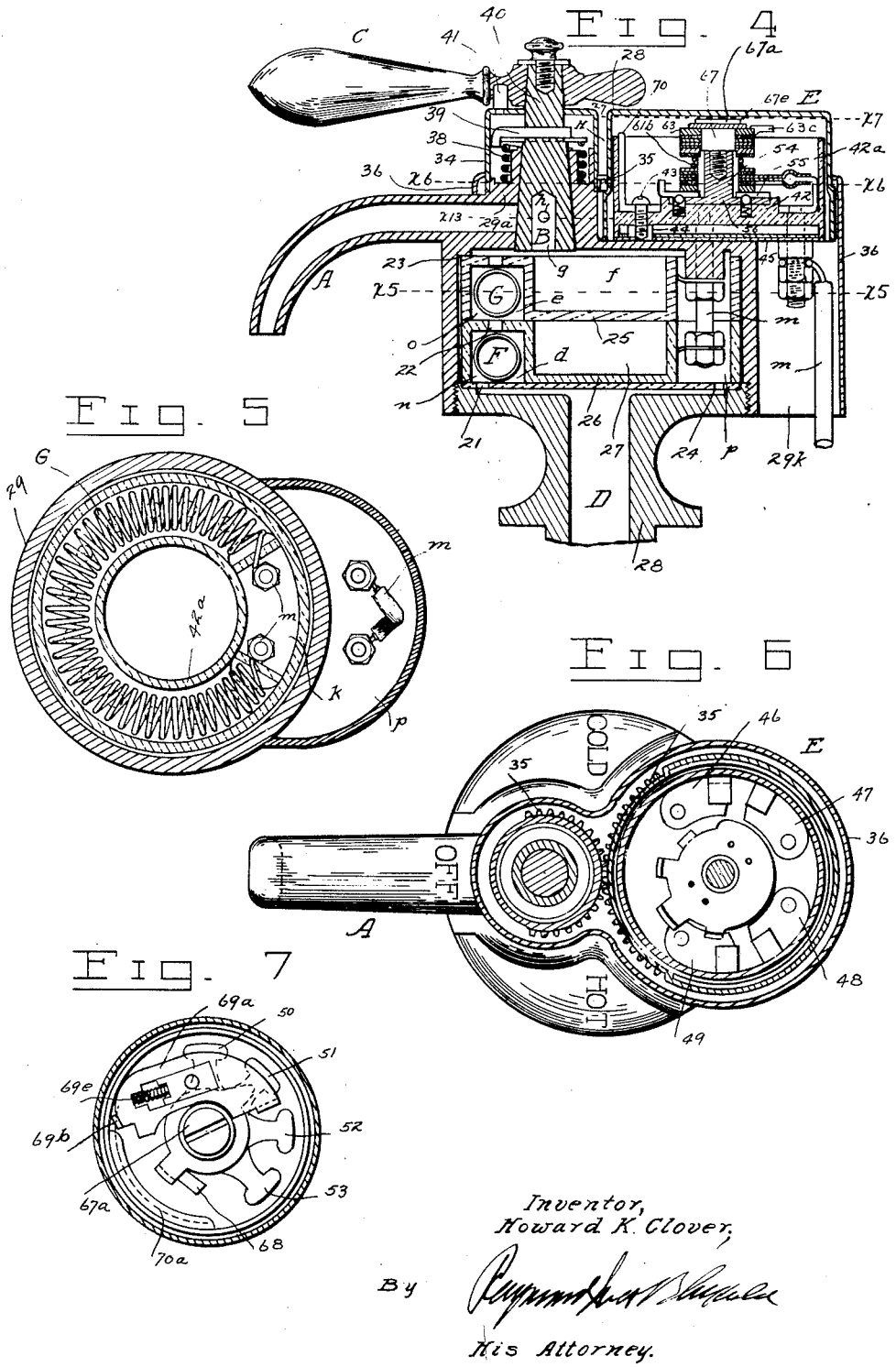

H. K. CLOVER.
ELECTRIC FAUCET.
APPLICATION FILED JAN. 14, 1919.
1,345,748.
Patented July 6, 1920.
4 SHEETS—SHEET 3.
Fig. 8
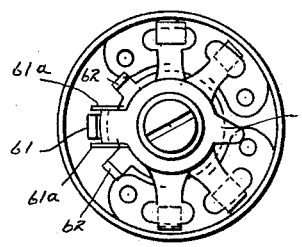
Fig. 9
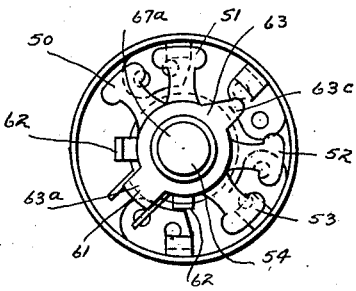
Fig. 10
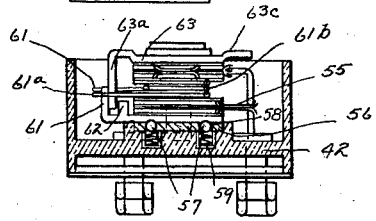
Fig. 11
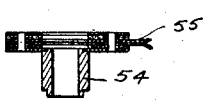
Fig. 12
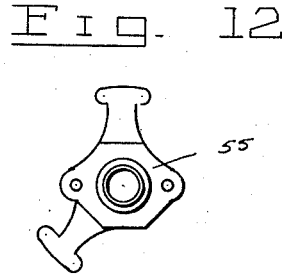
Fig. 13
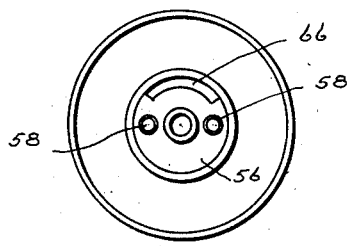
Fig. 14
Fig. 16
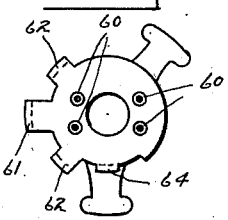
Fig. 15
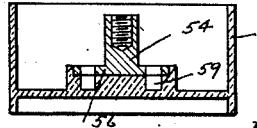
Fig. 17
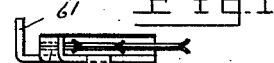
Inventor,
Howard K. Clover.
By
His Attorney.

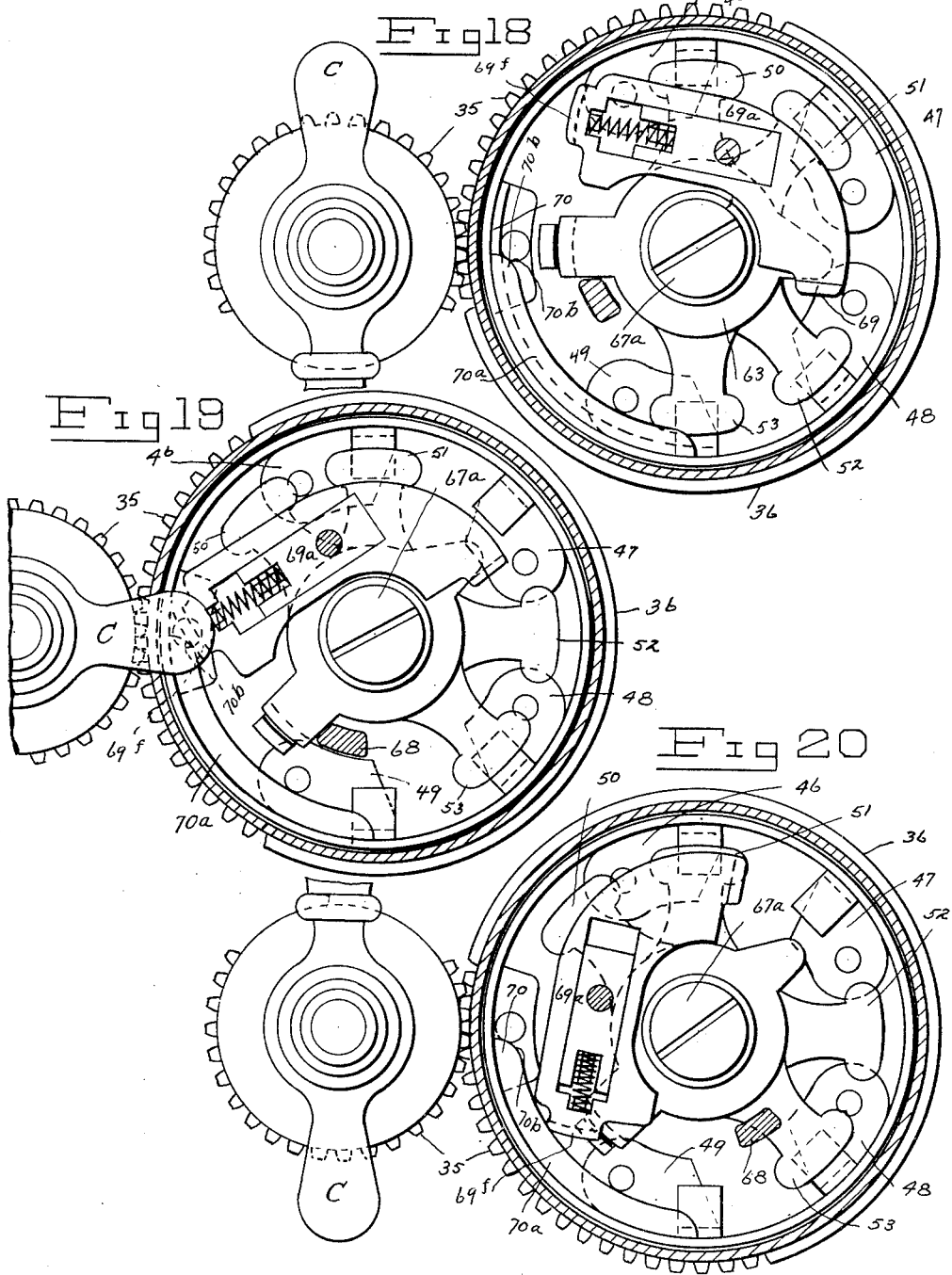

UNITED STATES PATENT OFFICE.

HOWARD K. CLOVER, OF LOS ANGELES, CALIFORNIA, ASSIGNOR TO CLOVER ELECTRIC CORPORATION, OF LOS ANGELES, CALIFORNIA, A CORPORATION OF NEVADA.

ELECTRIC FAUCET.

1,345,748.  Specification of Letters Patent.  Patented July 6, 1920.

Application filed January 14, 1919. Serial No. 271,017.

*To all whom it may concern:*

Be it known that I, HOWARD K. CLOVER, a citizen of the United States, residing at Los Angeles, in the county of Los Angeles and State of California, have invented new and useful Improvements in Electric Faucets, of which the following is a specification.

This invention relates to faucets, and more particularly to faucets whereby either cold, hot or warm fluid may be dispensed or delivered, and whereby the flow of fluid may be initiated or terminated subject to such varying thermal conditions. In carrying out the invention I provide for heating the water or fluid by converted electrical energy, in a chamber or chambers in which electrical resistance is disposed, such chamber or chambers being always filled with water under pressure so that such resistance elements are at all times submerged, which prevents their oxidation and deterioration. The energization of such resistance elements is caused or permitted subject to the action of a controller which is operated by, or conjointly with the movement of, the faucet handle, to the end that, in delivering water, the flow of such water is first initiated, followed by energization of the resistance element or elements. Prior to the turning off of the water the resistance element or elements is or are deënergized. Thus conversion of electrical energy into heat only takes place during periods of water flow and delivery. The overheating of the resistance elements, with resultant deterioration, or destruction, is thus prevented. The organization of a preferred embodiment of the invention preferably provides for energization of the resistance elements prior to turning on the water, if this be desirable, as for obtaining sudden or high liquid heating, and this result may be obtained through a simple relative adjustment of parts or features, at the will of the operator of the faucet device.

The faucet preferably includes a valve or cock member which is peculiary organized with respect to its ports or passages, so that either hot or cold water may be dispensed by the faucet. In other words, cold water may be dispensed by the faucet resultant upon moving the faucet handle in one direction, movement of such handle in the other direction setting up the sequence of operations above referred to, namely, first turning on of the water, then energizing of the resistance elements, and finally deënergization of said elements and turning off the water.

The controller member utilized as above set forth, is preferably organized to include a make-and-break device which is reciprocatory in its action, so that the circuit is made responsive to movement of the faucet handle in one direction, and broken responsive to handle movement in the other direction; and each of such actions occurs subject to the actuation of the same elements which yieldingly and resiliently produce both of such results, minus any sparking or arc production. And all this is caused through simple opposite rotation of a part actuated in the opposite partial rotations of the faucet member. The invention has for further objects the provision of an improved faucet device which will be generally superior in relative simplicity and inexpensiveness of construction, taken in conjunction with facility and simplicity in control, reliability, durability, positiveness in action, and freedom from liability to get out of order or repair, and which will be generally superior in efficiency and serviceability. The faucet is likewise organized so as to permit of the dispensing and delivery of water at any desired temperature between normal cold temperature and the boiling point, and this is all subject to predetermination of properly positioning the faucet handle.

With the above and other objects in view, the invention consists in the novel and useful provision, formation, combination, association and relative arrangement of parts, members and features, all as hereinafter described, shown in the drawings, and finally pointed out in claims.

In the drawings:

Figure 1 is a side elevation, partly in section, of a faucet device installed in position for use, and constructed in accordance with the invention;

Fig. 2 is a top plan view of the same;

Fig. 3 is a detail transverse horizontal sectional view, taken upon the line $x^3$—$x^3$ Fig. 1, and looking in the direction of the appended arrows;

Fig. 4 is a vertical transverse sectional view taken through the spout or spigot, parts being in elevation;

Fig. 5 is a detail horizontal transverse sectional view, taken upon the line $x^5$—$x^5$, Fig. 4;

Fig. 6 is a detail horizontal transverse sectional view, taken upon the line $x^6$—$x^6$, Fig. 4;

Fig. 7 is a detail transverse horizontal sectional view, taken upon the line $x^7$—$x^7$, Fig. 1;

Figs. 8 to 12 and 14 to 17, inclusive in both instances, are detail views, partly in section, of assembled and detached parts and features of the controller shown in Figs. 1, 2, 3, 4, 6, 7, 18, 19 and 20;

Fig. 13 is a detail horizontal transverse sectional view taken upon the line $x^{13}$—$x^{13}$, Fig. 4; and, Figs. 18, 19 and 20 are enlarged detail transverse horizontal sectional views, taken upon the line $x^8$—$x^8$, Fig. 4.

Corresponding parts in all the figures are designated by the same reference characters.

Referring with particularity to the drawings, the improved faucet device therein disclosed comprises a spigot or spout A to and through which water is delivered and dispensed subject to flow control by a cock or valve B having a handle C, such water flow being maintained through a passage D through which water is delivered to chambers $d$, $e$ and $f$, adapted to be in communication with an axial passage $g$ in a cock B, and hot and cold water passages, respectively, $h$ and $k$ in such valve or cock B. E designates a controller whereby energization of resistance heating elements F and G is governed, to the end that electrical energy may be passed to or cut off from such resistance elements, through an electrical path $m$. These elements G and F are incased each in a separate housing or chamber $n$, and $o$, respectively, which chambers are preferably annular and within which such resistance elements are disposed in coil formation. The chamber $d$ communicates with the passage D through a port or ports 21, the chamber $d$ communicates with the chamber $e$ through a port or ports 22, and the chamber $e$ communicates with the chamber $f$, and the passage $g$ in the valve, by a port or ports 23. The passage D communicates with a chamber $p$ through a port or ports 24, such chamber $p$ containing members of the electrical path $m$. The chambers $e$ and $f$ are contained within a housing 25, and the chamber $d$ is contained within a housing 26, the housing 25 being superimposed upon the housing 26, and providing a dead air space or chamber 27 between such housings. This chamber 27 corresponds to the chamber $f$, and is provided in the provision of the annular chambers $d$ and $e$, and such annular chambers are best conducive to the utilization of the heat generated by the resistance elements in quickly raising the temperature of the water. As shown, the passage D is provided in a fitting 28 screwed into the bottom of a housing 29 which contains the casings 25 and 26, and the spigot A projects from the upper portion of such housing 29. The controller E is disposed upon the top of the housing 29, and the valve B and its handle C project above the spigot A. All of these features of casing and chamber construction are subject to modification in accordance with preference, and their construction will be readily understood by any one skilled in the plumber's art. As shown in Fig. 1, the water service pipe is adapted to be joined onto the fitting 28 through a bib 30 which is held by a thread 31 and a nut 32 to the lavatory wall 33.

H designates means of operative connection between the faucet valve and handle B—C, and a controller housing 2, whereby partial rotation of such valve and its handle produces partial and opposite rotation of such housing. To this end, such means H comprise a cap 34 through an opening in the top of which the stem of the valve B rises, and which cap is mounted to turn upon a vertical axis upon or about a boss $29^a$ which boss rises from the housing 29 and within which boss the stem of the valve B turns. This cap and the housing 2 are provided with intermeshing teeth 35, arranged in annular series upon the respective parts, and whereby the housing 2 is given a partial rotation upon partial rotation of the cap 34, but in opposite directions. A gear tooth housing 36 covers the teeth 35 upon the cap 34 and upon the housing 2; such housing 36 is suitably secured to the housing 29 which carries the faucet A. The valve B is fitted to its seat in the boss $29^a$ by complementary tapering surfaces, plug-cock fashion, and such valve is held to its seat by the compression of a spring 38 coiled about the boss $29^a$, and bearing against a pin and washer device 39 carried by a stem 40 of the valve B, which pin likewise serves to stop the rotation of such stem. The cap 34 and the valve handle C are coupled together for joint movement by a pin 41 rising from such cap and entering a suitable recess in the handle.

The controller E has as its function, as stated, the energizing of the resistance elements F and G. This is performed through the electrical path $m$, and these electrical resistance elements, which are shown as connected in multiple may obviously be connected up in series. Likewise it is obvious that switch means might be employed for enabling either one or the other of such resistance elements to be energized separately and solely. Such construction is not illustrated, but its use would amount to a mere change in wiring or variation of the specific electrical path m shown in the drawings.

In order to make and break the electrical circuit through the path m, upon partial rotation of the controller housing 2 under actuation of the cap 34, to partially rotate the same, upon turning of the handle C in an appropriate direction, I provide, in one preferred form of construction and organization, a controller structure as follows: Within the housing r a porcelain base 42 for the controller is mounted upon the housing 29, or faucet body, being secured thereto by members of the electrical path m and by a screw 43 which passes through the bottom of said base and takes into a lug or boss 44 upon said housing 29, suitable insulation 45 being provided between said base and the top of such housing 29. Mounted within the housing 2 and supported by the base 42, are four fixed contact terminals, 46, 47, 48 and 49, with which respectively coact spring contact members 50, 51, 52 and 53. Contact is made and broken by partial rotation, in opposite directions, of this group of spring contacts, such spring contacts in such group playing rotatively about a central post or stud 54 which is secured to the porcelain base 42. Connected with such group of spring contacts, at the bottom of the same, is one member, 55, of a yielding lock, such member comprising a plate or disk which rests upon another member 56 of such switch device, the latter being a bottom or foundation plate for the entire group of controller elements above described, and being mounted fast upon the central portion of the bottom of the porcelain base 42. Between the two plates 55 and 56 are provided interlocking members effective between such plates, the same consisting of yieldingly mounted objects 57, such as balls, which play vertically through openings 58 in the lower plate 56 under the upward pressure of coiled compression springs 59 housed in the bottom of the porcelain base 42. These balls are adapted to be received in recesses or pockets 60 in the bottom of the upper plate 55, to hold the said plates in locked relation, and consequently hold the spring contacts in locked relation, either in contact with or out of contact with the contact terminals 46—48 inclusive. The upper locking plate 55 is provided with a lateral and upwardly projecting bent finger 61, ranging between two similarly formed and similarly projecting fingers 62, the finger 61 lying in an arc concentric with the arc within which the fingers 62 lie, the centers of such arcs being the axis of the stud 54, and such arcs being of different radii, the arc of the finger 61 having the longest radius. The finger 61 is embraced by the ends 61$^a$ of a coil spring 61$^b$ which is wound about the stud 54, such end portions 61$^a$ being crossed and bent to embrace the finger 61 so as to put it under opposed pressures. Rotatively mounted above the group of spring contacts, is a device 63 which centers about the stud 54, and the same is provided at one side with a depending cocking finger 63$^a$ which is disposed between the crossed ends 61$^a$ of the coil spring 61$^b$ and is located in the arc within which is disposed the fingers 62 at either side of the finger 61 upon the upper locking plate 55. Means about to be described are employed for causing the oscillation of the cocking device 63, and the action of such cocking device is as follows: When oscillated in either direction it first builds up tension in the spring 61$^b$, so as to increase the pressure of one of the spring ends 61$^a$ upon the respective side of the finger 61. Further movement of the cocking finger 63$^a$ brings it into engagement with the finger 62 which is disposed at the side of the finger 61 opposite to that at which the pressure of the spring is built up, as last recited. Continued movement of the device 63 causes the upper locking plate 55 to be axially moved to such an extent as to cause slight depression of the locking balls 57 in their holes 58 in the lower plate 56, and this recession of such interlocking balls from the recesses 60 in the upper plate 55 is sufficient to free the upper plate 55 to the extent required for its spring-actuation, which then ensues, under the urge of the spring ends 61$^a$ upon the finger 61, due to the built-up pressure of the spring last recited. It will be noted that the recesses 60 in the upper plate 55 are arranged in two pairs, the recesses of each pair being utilized to receive and accommodate the balls 57 when the upper locking plate 55 is in one of its locked positions. The interlocking balls 57 ride up into the proper recesses 60 at the termination of the axial movement of the upper plate 55, and such termination is caused by the stop action of a downwardly ranging lug 64 upon the upper plate 55, and which travels in an arcuate path in a peripheral recess 66 in the bottom plate 56. Engagement of such lug 64 with either end wall of such recess 66 terminates axial play, under quick spring action, of the upper plate 55 in the respective direction. Thus the cocking device 63 is utilized both to build up pressure in the spring 61$^b$ for the quick spring actuation of the upper plate 55, and is also used to unlock the two plates by the initiation of displacement of the balls 57 from the respective recesses 60; and the spring pressure so produced in the movement of the cocking device causes the actual relative movement of the locking plates in quick non-arcing action with respect to the spring contacts which travel jointly with such upper locking plate.

The several members of the group including the locking plates 55 and 56, the spring contacts, the spring 61ᵇ, and the cocking device 63, are held in assemblage with the stud 54 as a center, by a screw 67 which has a flat head 67ᵃ.

It remains now to be set forth in what manner and by what means the cocking device 63 is actuated, to produce opposite actuations of the upper locking plate 55, all as above set forth. Co-acting with the cocking device 63, by means of a nose 63ᶜ projecting from its periphery at a point substantially diametrically opposite to the cocking finger 63ᵃ, are two cocking device actuators, 68 and 69 respectively, the former being fixed upon and projecting downwardly from the top surface of the controller housing $r$, and the latter being movably disposed beneath such housing top wall and carried by an actuator plate 69ᵃ which reciprocates in a chord of the circular periphery of the controller housing 2, being controlled by a guide plate 69ᵇ with which the side walls of an elongated opening 69ᶜ in the actuator plate engage, such guide plate being held to the top of the housing $r$ by a screw or other means 69ᵈ; a coil compression spring 69ᵉ being disposed between one end wall of said elongated opening and the corresponding end portion of the guide plate 69ᵇ. The formation and inter-relation and relative arrangement of the nose 63ᶜ, and the actuators 68 and 69 as well as the finger 63ᵃ, are such, and with respect to the device 69, are so maintained by the spring 69ᵉ, that said devices 68 and 69 lie within the arcuate path of the nose 63ᶜ and finger 63ᵃ; or, the arcuate paths of said devices 68 and 69 and of said nose 63ᶜ and said finger 63ᵃ coincide. This is the condition normally, or with the parts related for a swing of the valve handle C to the right so as to turn on the water and also operate the controller to pass electrical energy to the resistance elements; and also, reversely, or inversely, to cut off the electrical energy from the resistance elements and turn off the water and terminate its dispensing through the faucet. When the handle C is first turned to the right the actuator device 68 will be brought into engagement with the finger 63ᵃ, causing the actuator device to tension the spring 61ᵇ, free the plates 55 and 56 from locked relation through the interlocking balls 57, and ultimately cause the locking plates to be relatively moved to close a circuit through the electrical path and energize the resistance elements. An inverse movement of the handle C will cause the nose 63ᶜ upon the cocking device to be brought into engagement with the actuator device 69, causing the fingers 63ᵃ to oppositely tense the spring 61ᵇ and to again unlock the plates 55 and 56 by unseating the entire locking balls 57, and finally to positively turn the upper plate 55 in an opposite direction, breaking the electric circuit through the path $m$ and deënergizing the resistance elements. After both of these operations a locking relation is reëstablished, as above set forth, through the interlocking balls 57. If now it be desired to utilize the faucet for dispensing cold water, without any operation of the controller E, to move the contact devices from normal position, in which they are out of contact with the contact terminals, the handle C is moved to the left, turning the controller housing 2 in a direction opposite to that in which it is turned for operation of the controller, and in this action the actuator devices 68 and 69 are rendered inoperative, the former because the housing 2 moves in such direction as to further remove the finger 63ᵃ from it, and in the latter instance cause the actuator device 69 is withdrawn from the path of the nose 63ᶜ, by means of a cam device 70 secured to the porcelain base 42 by the aforesaid screw 43, and which acts upon the actuator plate 69ᵃ at a nose 69ᶠ which is disposed at the end thereof opposite to the actuator device 69. This cam device 70 is provided with a long dwell or body portion 70ᵃ having a rounded terminal shoulder 70ᵇ which first engages with and outwardly urges the actuator plate 69ᵃ against the compression of the spring 69ᵉ, by direct contact with the nose 69ᶠ, such body portion or dwell 70ᵃ of the cam 70 being arcuate and disposed directly within the annular side wall of the controller housing 2, and properly positioned to engage with and actuate the actuator plate upon the initiation or turning of the housing $r$ in the direction caused by the swinging of the faucet handle to the left. When the faucet handle is restored to normal position so that the water and electrical energy are both cut off, this cam 70 comes out of engagement with the actuator plate 69ᵃ, and its actuator device 69 is brought back into the path of the nose 63ᶜ so that the parts including such nose and actuator device 68 and the finger 63ᵃ are again related for operation, as hereinabove described, to first close and then to open a circuit through the electrical path $m$ upon the spring of the faucet handle first to the right and then to restore it again to normal position.

Figs. 18, 19 and 20 show the cocking device 63, the spring contacts and contact terminals, and the actuator device 68 and 69, with the attendant features, including the cam 70, first, in Fig. 18, so related that the electrical path $m$ is energized, as to Fig. 19 so that the electrical path $m$ is deënergized and the water shut off, and as to Fig. 20 so that the electrical path $m$ is deënergized and the parts in the positions occupied when the cold water is turned on.

It will be readily understood how the cock or valve B operates either to permit or interrupt flow of either cold or hot water, the ports $h$ passing hot water to the spigot A, and the port $k$ passing cold water to the spigot or spout.

The chamber $f$ acts like the pressure chamber in a force pump by maintaining a steady, rather than pulsating flow of water, to and through the spout.

The valve stem 40 is held to its seat by the joint action of the spring 38 and the pressure of the water at the bottom of such stem, and such valve may always be cleared or freed at its seat by the flushing action of the water admitted to such seat by depressing the stem against the pressure of the water and spring. The porcelain base 42 is shown as having an upstanding peripheral flange or wall $42^a$ which is slightly spaced from the inner side wall of the housing 2, so that an oil bath may be contained within said porcelain base device within which the features of the controller are in the main immersed. The spacing away of the wall $42^a$ from the housing wall prevents any invasion of the oil chamber by capillary action of adsorption.

The temperature of the water may be varied, or modified from its highest heat, by operating the faucet C into any desired position between extreme right position and normal position, so that the electrical path being still energized, and the plates 55 and 56 interlocked, the flow of water through the faucet is varied in volume, thus varying the supply of heat per liquid volume unit, and in that manner varying the temperature of the dispensed fluid. Either the controller members for energizing the electrical path $m$ or the faucet valve D may be retarded in action, with respect to the other, so as to vary the order in which the energization of the resistance elements and the turning on or off of the water occurs, in this manner either the electrical energy may be first brought into action to heat the water, or the water may be first turned on, or vice versa, the converse holding with respect to deënergization and turning off of the water. This may be done by merely raising the housing of the controller, and varying the inter-mesh of the teeth 35, and again lowering the housing 2 to maintain such variation of inter-mesh. The ratio between the radii of the two arcuate series of teeth 35 is substantially two to one, in favor of the teeth 35 upon the controller housing 2, so that the faucet handle movement may cause a proportionately faster movement of the faucet valve B than of the controller parts. This permits of the various operations of the device above described, such as the variation of temperature of the water during a period of energization of the resistance elements.

The invention provides effectually for the heating and dispensing of water, or, alternatively, the dispensing of cold water, and it will be obvious that the invention may be adapted to the heating and dispensing of other fluids in a wide range of use of the invention, and that the invention also inheres in the several broad combinations and associations of parts and features, as well as in the particular embodiment shown in the drawings and hereinabove described.

Having thus disclosed my invention, I claim and desire to secure by Letters Patent:

1. In a device of the charatcer disclosed, a controller for energizing and deënergizing an electrical path; said controller comprising electrical contact devices included within said electrical path, locking members one of which is operatively joined with certain of said contact devices, another locking member to which said first named locking member is relatively movable, interlocking devices between said locking members, a device for operating said movable locking member, and a device for unlocking said locking members to permit such movement; there being resilient means through which the unlocking of said locking members is effected; said devices for unlocking said locking members and relatively moving the same comprising in unitary construction a cocking device, said resilient means comprising a spring separate portions of which embrace said cocking device in part and likewise bear upon said movable locking member.

2. In a device of the character disclosed, a controller for energizing and deënergizing an electrical path; said controller comprising electrical contact devices included within said electrical path, locking members one of which is operatively joined with certain of said contact devices, another locking member to which said first named locking member is relatively movable, interlocking devices between said locking members, a device for operating said movable locking member, and a device for unlocking said locking members to permit such movement; there being resilient means through which the unlocking of said locking members is effected; said devices for unlocking said locking members and relatively moving the same comprising in unitary construction a cocking device, said resilient means comprising a spring separate portions of which embrace said cocking device in part and likewise bear upon said movable locking member; said movable locking member being provided with means limiting its movement in either direction.

3. In a device of the character disclosed, a controller for energizing and deënergizing an electrical path; said controller comprising electrical contact devices included within said electrical path, locking members one of which is operatively joined with certain of said contact devices, another locking member to which said first named locking member is relatively movable, interlocking devices between said locking members, a device for operating said movable locking member, and a device for unlocking said locking members to permit such movement; there being resilient means through which the unlocking of said locking members is effected; said devices for unlocking said locking members and relatively moving the same comprising in unitary construction a cocking device, said resilient means comprising a spring separate portions of which embrace said cocking device in part and likewise bear upon said movable locking member; a housing being provided for the said parts of said controller and provided with spaced actuator devices for said cocking device, one of said actuator devices being movable with relation to the other, and means being provided for moving the same independently of the other and to thereby free the cocking device from said actuator devices.

4. In a device of the character disclosed, a controller for energizing and deënergizing an electrical path; said controller comprising electrical contact devices included within said electrical path, locking members one of which is operatively joined with certain of said contact devices, another locking member to which said first named locking member is relatively movable, interlocking devices between said locking members, a device for operating said movable locking member, and a device for unlocking said locking members to permit such movement; there being resilient means through which the unlocking of said locking members is effected; said devices for unlocking said locking members and relatively moving the same comprising in unitary construction a cocking device, said resilient means comprising a spring separate portions of which embrace said cocking device in part and likewise bear upon said movable locking member; a housing being provided for the said parts of said controller and provided with spaced actuator devices for said cocking device, one of said actuator devices being movable with relation to the other, and means being provided for moving the same independently of the other and to thereby free the cocking device from said actuator devices; in combination with a dispensing means member adapted to initiate or check the flow of liquid through the dispensing means and movably associated with said means for throwing said actuator devices out of operation.

5. In a device of the character disclosed, a controller for energizing and deënergizing an electrical path; said controller comprising electrical contact devices included within said electrical path, locking members one of which is operatively joined with certain of said contact devices, another locking member to which said first named locking member is relatively movable, interlocking devices between said locking members, a device for operating said movable locking member, and a device for unlocking said locking members to permit such movement; there being resilient means through which the unlocking of said locking members is effected; said devices for unlocking said locking members and relatively moving the same comprising in unitary construction a cocking device, said resilient means comprising a spring separate portions of which embrace said cocking device in part and likewise bear upon said movable locking member; a housing being provided for the said parts of said controller and provided with spaced actuator devices for said cocking device, one of said actuator devices being movable with relation to the other, and means being provided for moving the same independently of the other and to thereby free the cocking device from said actuator devices; in combination with a dispensing means member adapted to initiate or check the flow of liquid through the dispensing means and movably associated with said means for throwing said actuator devices out of operation; said cocking device being mounted to oscillate and provided with a nose for engagement with said movable actuator device, and with a finger for engagement with said fixed actuator device; said finger being included within the means for interlocking said movable locking member.

6. In a device of the character disclosed, a controller for energizing and deënergizing an electrical path; said controller comprising electrical contact devices included within said electrical path, locking members one of which is operatively joined with certain of said contact devices, another locking member to which said first named locking member is relatively movable, interlocking devices between said locking members, a device for operating said movable locking member, and a device for unlocking said locking members to permit such movement; there being resilient means through which the unlocking of said locking members is effected; said devices for unlocking said locking members and relatively moving the same comprising in unitary unlocking said locking members to permit such movement; there being resilient means through which the unlocking of said locking members is effected; said devices for unlocking said locking members and relatively moving the same comprising in unitary construction a cocking device, said resilient means comprising a spring separate portions of which embrace said cocking device in part and likewise bear upon said movable locking member; a housing being provided for the said parts of said controller and provided with spaced actuator devices for said cocking device, one of said actuator devices being movable with relation to the other and means being provided for moving the same independently of the other and to thereby free the cocking device from said actuator devices; in combination with a dispensing means member adapted to initiate or check the flow of liquid through the dispensing means and movably associated with said means for throwing said actuator devices out of operation; said cocking device being mounted to oscillate and provided with a nose for engagement with said movable actuator device, and with a finger for engagement with said fixed actuator device; said finger being included within the means for unlocking said movable locking member; said movable locking member being provided with fingers with which said last named finger alternately and separately co-acts in unlocking action, and with a finger with which said resilient means co-act to move said movable locking member.

7. In a device of the character disclosed, a dispensing device provided with a valve and valve handle, means for heating fluid to be passed to said dispensing device, a controller for said heating means, a housing for said controller, said housing being rotatably mounted, and operative connections between said device and its handle and said housing whereby said controller is operated.

8. In a device of the character disclosed, a dispensing device provided with a valve and valve handle, means for heating fluid to be passed to said dispensing device, a controller for said heating means, a housing for said controller, said housing being rotatably mounted, and operative connections between said device and its handle and said housing whereby said controller is operated; said device being provided with gear teeth and said housing being provided with gear teeth meshing with said first mentioned gear teeth; and a gear housing being disposed over all of said gear teeth and confining said controller housing to its operative position.

9. In a device of the character disclosed, a dispensing member for liquid, and a plurality of resistance elements for energization electrically to heat the fluid; a separate housing being provided for each of said resistance elements and coöperating means for equalizing the pressure of the incoming fluid.

10. In a device of the character disclosed, a member for dispensing fluid, a resistance element for utilizing electrical energy to heat said fluid, and an insulating housing for said resistance element; there being a chamber provided in said housing through which the fluid passes and which provides for constant even pressure flow of fluid through the dispensing member.

11. In a device of the character disclosed, a member for dispensing fluid, a resistance element for utilizing electrical energy to heat said fluid, and an insulating housing for said resistance element; there being a chamber provided in said housing through which the fluid passes and which provides for constant even pressure flow of fluid through the dispensing member; said resistance element being mounted in a chamber separate from said first named chamber and communicating therewith.

In testimony whereof, I have signed my name to this specification in the presence of two subscribing witnesses.

HOWARD K. CLOVER.

Witnesses:
 ELIZABETH K. WOLATT,
 VELMA MASSEY.